(12) United States Patent  
Derr et al.

(10) Patent No.: US 7,510,062 B2
(45) Date of Patent: Mar. 31, 2009

(54) ROTARY DAMPER

(75) Inventors: Calvin Derr, Chicago, IL (US); Chad K. Zeilenga, Midlothian, IL (US)

(73) Assignee: Illinois Tool Works Inc., Glenview, IL (US)

( * ) Notice: Subject to any disclaimer, the term of this patent is extended or adjusted under 35 U.S.C. 154(b) by 71 days.

(21) Appl. No.: 11/545,214

(22) Filed: Oct. 10, 2006

(65) Prior Publication Data

US 2007/0108000 A1      May 17, 2007

Related U.S. Application Data

(60) Provisional application No. 60/774,277, filed on Feb. 13, 2006, now abandoned, provisional application No. 60/736,549, filed on Nov. 14, 2005.

(51) Int. Cl.
*F16D 57/00* (2006.01)

(52) U.S. Cl. .................. 188/290; 267/205; 267/207; 188/381; 192/41 R; 192/105 BA

(58) Field of Classification Search .......... 267/205, 267/206, 207, 208, 215; 188/290–296, 196 D, 188/196 V, 381; 192/78, 77, 41 R, 46, 105 BA, 192/223, 223.2, 107 M; 16/307
See application file for complete search history.

(56) References Cited

U.S. PATENT DOCUMENTS 1,774,094 A      8/1930  Gulick
2,942,711 A  *   6/1960  Zindler .............. 192/105 BA
3,196,999 A  *   7/1965  Bradbury ................ 192/27
3,581,857 A  *   6/1971  Dallman ............... 192/41 R
3,727,738 A  *   4/1973  Briar ................. 192/105 CE
3,971,463 A  *   7/1976  Zindler .............. 192/105 BA
4,049,103 A  *   9/1977  Sessler .............. 192/105 CD
4,253,556 A  *   3/1981  Zindler ............... 192/17 R
4,666,386 A  *   5/1987  Winkler et al. .......... 418/267
5,067,598 A  * 11/1991  Ritter et al. .......... 192/223.2
5,109,571 A  *   5/1992  Ohshima et al. ............ 16/307
5,276,945 A      1/1994  Matsumura
5,560,465 A  * 10/1996  Zindler .............. 192/105 BA
5,582,276 A     12/1996  Berteau
5,697,122 A  * 12/1997  Okabe et al. .............. 16/82
6,158,561 A  * 12/2000  Sakai et al. ............. 192/35
6,189,666 B1 *   2/2001  Willmot ................. 192/46
6,422,354 B1 *   7/2002  Shaw et al. ............ 188/72.8
6,672,575 B2     1/2004  Flower et al.
6,755,291 B2 *   6/2004  Hirota et al. ............ 192/35
6,865,763 B2 *   3/2005  Sears ..................... 8/159
6,913,125 B2 *   7/2005  Hayashi ................ 188/290
6,920,968 B2 *   7/2005  Sakai et al. ............. 192/35

FOREIGN PATENT DOCUMENTS

FR          2660008         9/1991

* cited by examiner

*Primary Examiner*—Christopher P Schwartz
(74) *Attorney, Agent, or Firm*—Mark W. Croll; Paul F. Donovan

(57) ABSTRACT

A rotary damper includes a housing and a rotor rotatable in the housing. A clutch is movable toward and away from the housing when said rotor is rotated in first and second directions.

5 Claims, 2 Drawing Sheets

ROTARY DAMPER

CROSS-REFERENCE TO RELATED APPLICATIONS

The present regular United States Patent Application claims the benefits of U.S. Provisional Application Ser. No. 60/736,549, filed on Nov. 14, 2005 and U.S. Provisional Application Ser. No. 60/774,277, filed Feb. 13, 2006 now abandoned.

FIELD OF THE INVENTION

The present invention pertains generally to movement dampers and, more particularly to rotary dampers having a rotor rotatable in a housing to provide damping resistance for the movement of an object.

BACKGROUND OF THE INVENTION

Movement dampers of various types are known in a variety of assemblies and applications to control the movement of assembly components. For example, movement dampers are known for controlling the movement in at least one direction of a drawer or door in furniture, cabinets and appliances. In the automotive field it is known to use dampers on glove box and counsel doors as well as other doors and closures for bins, storage areas and the like.

In some situations, damping control is required only in one direction. So-called one-way dampers provide damping resistance when operated in one direction, but provide little or no damping resistance when operated in another direction.

Various types of rotary dampers are known for the above purposes, including for use as one-way dampers. A known design for rotary one-way dampers includes a housing and a rotor rotatable in the housing, with a shaft from the rotor extending outwardly of the housing for receiving a gear thereon to engage a gear on the device being controlled. In some rotary dampers of this type, a viscous fluid is provided in a sealed housing, and damping performance is provided by resistance of the fluid to rotation of the rotor within the housing. Various rotor configurations as well as housing configurations are used for porting the fluid in the housing to control the damping performance.

It also is known to use mechanical resistance in the housing without the use of damping fluid. Mechanical one-way dampers have been complex, often requiring springs and numerous parts to selectively engage or disengage cooperating components of the damper system. Such structures add complexity and cost to the overall assembly.

Accordingly, it is desirable to have a relatively simple rotary damper that automatically provides damping performance when rotated in one direction and little or no damping performance and only minimal resistance when rotated in an opposite direction, without the need for complex and expensive structure for engaging components.

SUMMARY OF THE INVENTION

The present invention provides a rotary damper having an internal clutch mechanism whereby the damper is rendered effective or ineffective for damping, depending on the direction the rotor is rotated.

In one aspect thereof, the present invention provides a rotary damper with a housing having a housing inner surface, a rotor rotatable in the housing and a clutch between the rotor and the housing surface. One of the rotor and the clutch has a lobe facing the other of the rotor and the clutch. The other of the rotor and the clutch has a slot opening toward the lobe. The lobe is positioned at a first depth in the slot when the rotor is rotated in one direction, with a gap established between the clutch and the housing inner surface. The lobe is positioned at a second depth in the slot more shallow than the first depth when the rotor is rotated in a second direction, with the gap being one of reduced and eliminated.

In another aspect thereof, the present invention provides a rotary damper with a housing, a rotor axially rotatable in the housing, and a plurality of clutch leaves disposed between the housing and the rotor. The leaves are engaged with the rotor and are disposed radially outward against the housing when the rotor is rotated in a first direction and radially inward away from the housing when the rotor is rotated in a second direction.

In a still further aspect thereof, the present invention provides a rotary damper with a housing having a bottom, a rotor having a rotor plate rotatable in the housing in a substantially fixed position axially in the housing, and a clutch plate engaged with the rotor for axial movement in the housing. The clutch plate is disposed at first and second distances from the bottom when the rotor is rotated in first and second directions, respectively.

An advantage of the present invention is providing a one-way rotary damper that adjusts automatically for providing damping performance in only one direction of rotor rotation.

Another advantage of the present invention is providing a one-way rotary damper that is simple to manufacture, assemble and use.

Other features and advantages of the invention will become apparent to those skilled in the art upon review of the following detailed description, claims and drawings in which like numerals are used to designate like features.

Figure 1:
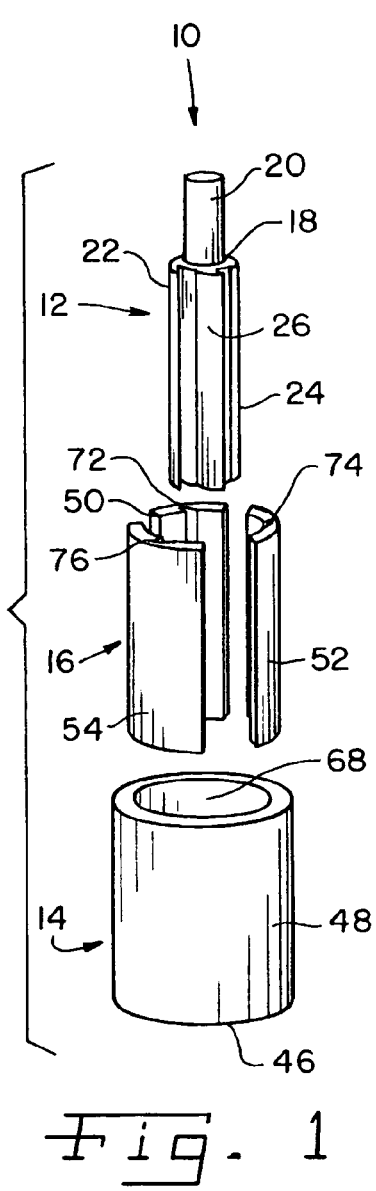
FIG. 1 is an exploded view of a rotary damper in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, a rotary damper 10 in accordance with the present invention is shown. Damper 10 includes a rotor 12 operable in a housing 14, with a clutch 16 interposed between rotor 12 and housing 14. Rotor 12, housing 14 and clutch 16 can be made from injection molded plastic or other suitable materials.

Rotor 12 includes a main body portion 18 operable within housing 14 and a shaft 20 extending outwardly of housing 14 for receiving a gear or the like, or for otherwise connecting damper 10 within a system having a component for which control is to be provided by damper 10.

Main body 18 includes a plurality of lobes 22, 24, 26 axially disposed thereon, and in the exemplary embodiment includes three lobes 22, 24 and 26. However, those skilled in the art should understand that two lobes or more than three lobes also can be used. Each lobe is a wedge-shaped structure as viewed in cross-section, and includes a radially outer end 28, 30, 32, respectively, for lobes 22, 24, 26 and a radially inner end 34, 36, 38, respectively. Accordingly, lobes 22, 24, 26 have angular outer surfaces 40, 42, 44, respectively, defined between the radially outer end and the radially inner end of each lobe. In the exemplary embodiment shown, each lobe 22, 24, 26 extends substantially the entire axial length of main body 18; however, lobes shorter than the full axial length of main body 18 can be used, and shorter lobes can be arranged in end to end arrangements along the length of body 18.

Housing 14 is a cylindrical structure having a bottom 46 and a side wall 48. An inside surface of housing 14, such as an inside surface of wall 48, provides resistance to the rotation of another surface there against, such as an outer surface of clutch 16, as will be described in more detail hereinafter.

Clutch 16 includes a plurality of leaves 50, 52, 54 and in the exemplary embodiment includes three leaves 50, 52, 54. Clutch 16 provides a separate leaf for each lobe of rotor 12. Accordingly, clutch 16 in the exemplary embodiment includes three lobes 50, 52, 54. Leaves 50, 52, 54 are separate one from the other and define an annular assembly in which rotor 12 operates. Leaves 50, 52, 54 are spaced one from another and define gaps 56, 58 and 60 between adjacent leaf pairs 50, 52; 52, 54; and 54, 50. As will be described more completely hereinafter, leaves 50, 52, 54 operate between rotor 12 and housing 14 to create torque or damping resistance when rotated in one direction and minimal torque or damping resistance when rotated in an opposite direction. Accordingly, outer surfaces 62, 64, 66 of leaves 50, 52, 54 are of a contour to confront against an inner surface 68 of housing 14 when leaves 50, 52, 54 are moved there against and to provide a gap 70 when leaves 50, 52, 54 are moved away from surface 68.

Slots 72, 74, 76 are provided on the inner surfaces of leaves 50, 52, 54 respectively. Slots 72, 74, 76 are configured to cooperate with and receive lobes 22, 24, 26 to move outwardly against housing surface 68 when rotor 14 is rotated in one direction and to move inwardly away from surface 68, creating gap 70, when rotor 14 is rotated in an opposite direction. Accordingly, slots 72, 74, 76 have radially deeper slot ends 78, 80 and 82 for receiving radially outer ends 28, 30 and 32 of lobes 22, 24, 26, respectively. Each slot 72, 74, 76 further includes and is defined by a lead surface 84, 86, 88, respectively, and a trailing surface 90, 92, 94, respectively.

Figure 2:
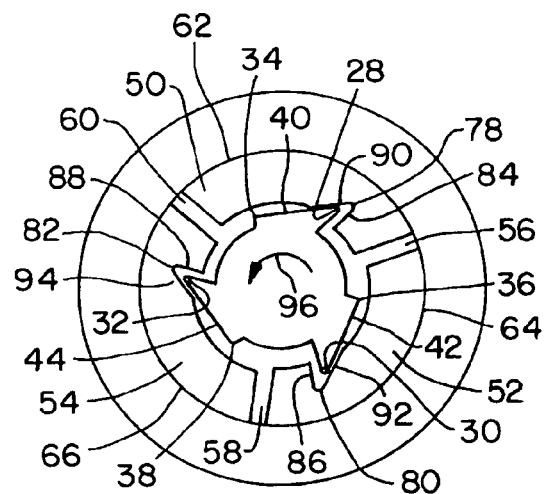
FIG. 2 is a cross-sectional view of the rotary damper shown in FIG. 1 illustrating operation of the damper to provide damping performance.

FIG. 2 illustrates operation of damper 10 to provide torque or damping performance. Rotor 12 is rotated in a counter-clock-wise direction as indicated by arrow 96. Lobes 22, 24 and 26 withdraw partially from slots 72, 74, 76, respectively. Outer surfaces 40, 42, 44 of lobes 22, 24 and 26 confront and engage trailing surfaces 90, 92 and 94 of leaves 50, 52 and 54. Because of the angular relationships between outer surfaces 40, 42 and 44 and trailing surfaces 90, 92 and 94, leaves 50, 52 and 54 are urged outwardly such that gap 70 is eliminated as outer surfaces 62, 64 and 66 are moved closer to or against inner surface 68 of housing 14. Resistance to sliding movement of leaves 50, 52 and 54 along inner surface 68 provides torque and damping performance to a device connected to rotor shaft 20.

Figure 3:
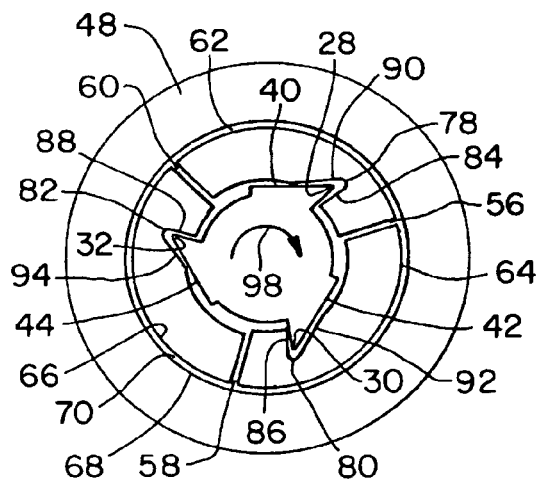
FIG. 3 is a cross-sectional view similar to that of FIG. 2, but illustrating rotation of the damper in an opposite direction to provide free wheeling rotation with no damping performance.

FIG. 3 illustrates the operation of damper 10 with rotor 12 rotated in a clockwise direction, as indicated by arrow 98. Lobes 22, 24 and 26 slide into slots 72, 74, 76 respectively. As the lobes move deeper into the slots, leaves 50, 52, 54 are drawn closer to main body 18 and are drawn away from inner surface 68 of housing 14. Gaps 56, 58 and 60 between adjacent leaves 50, 52, 54 become smaller, and gap 70 is formed between housing inner surface 68 and leaves 50, 52, 54. Since no radially outward directed force is applied against leaves 50, 52, 54, minimal resistance occurs to rotation of rotor 12. Consequently, torque is not generated and no damping performance occurs.

It should be understood that the materials used for outer surfaces 62, 64, 66 of leaves 50, 52, 54 and for inner surface 68 of housing 12 can be selected to provide the desired friction when one is moved against the other. Surface coatings can be used and/or the various components can be monolithic bodies of a desired material. Rigid base materials can be used for the leaves and/or housing, and the base material can be overmolded with a thermoplastic or rubber material having the desired friction characteristics. It may be desirable in some applications and uses of the invention to use lubricants such as graphite, silicone or the like on the frictional component surfaces to control damping performance and for improved life.

Figure 4:
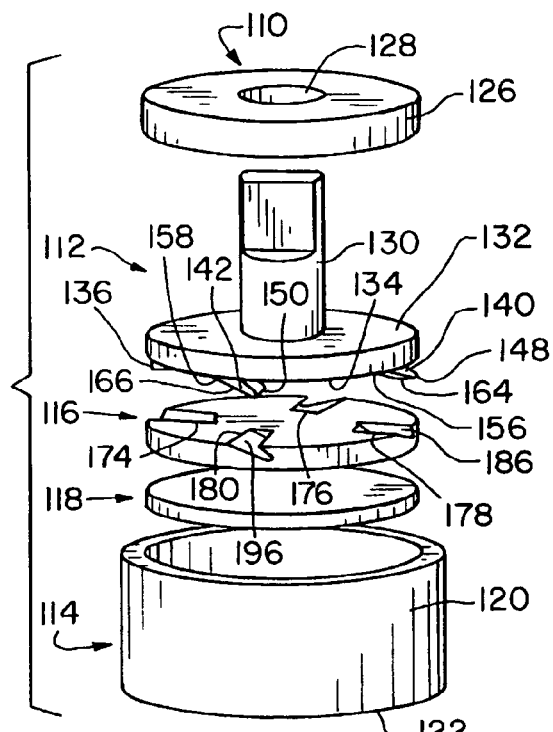
FIG. 4 is an exploded view of another embodiment of a rotary damper in accordance with the present invention.
Figure 5:
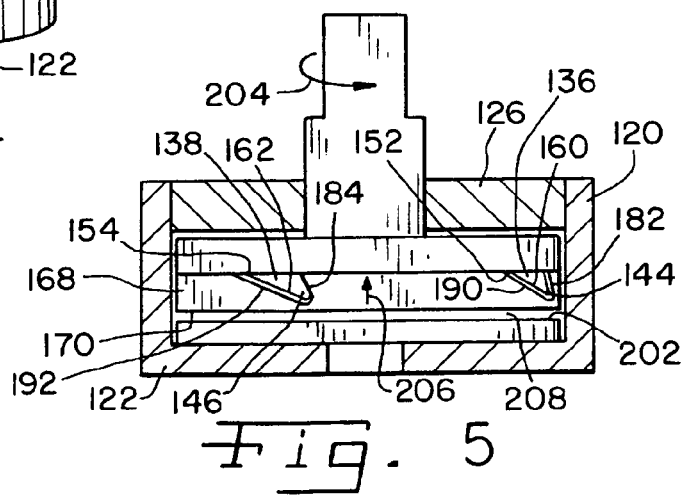
FIG. 5 is a cross-sectional view illustrating an assembled damper of FIG. 4 operated in a first direction to provide no damping performance.
Figure 6:
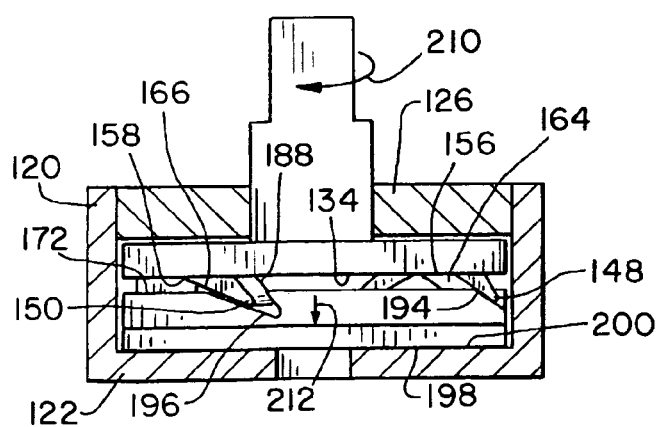
FIG. 6 is a cross-sectional view similar to that of FIG. 5, but at a different rotational angle of the internal components and illustrating the damper operated in an opposite direction to that of FIG. 5, to provide damping performance.

FIGS. 4, 5 and 6 illustrate another embodiment of the present invention. A rotary damper 110 includes a rotor 112 and a housing 114 in which rotor 112 operates. A clutch 116 and friction disk 118 are provided to operate with rotor 112 and housing 114.

Housing 114 includes a side 120 and a bottom 122. A cap 126 is provided for closing housing 114 and defines a hole 128 therethrough.

Rotor 112 includes a rotor shaft 130 extending outwardly from housing 114 through hole 128 in cap 126. Rotor 112 further includes a rotor plate 132 rotatable within housing 114 at a substantially fixed position axially in the housing. On an end surface 134 of plate 132 opposite shaft 130 lobes 136, 138, 140 and 142 are defined. Each lobe 136, 138, 140 and 142 is a wedge-shaped projection from surface 134 of plate 132. Accordingly, lobes 136, 138, 140 and 142 have axially distant ends 144, 146, 148 and 150 and axially nearer ends 152, 154, 156 and 158 with respect to surface 134 of plate 132. Lobe surfaces 160, 162, 164 and 166 are defined between the respective ends of each lobe. In the exemplary embodiment shown, four lobes 136, 138, 140, 142 are shown; however, more or fewer than four lobes can be used.

Clutch 116 is a plate or disk 168 having a surface 170 facing friction disk 118. On an opposite surface 172 thereof, facing rotor plate 132, plate 168 is provided with slots 174, 176, 178 and 180. Slots 174, 176, 178, 180 are configured with respect to the shape of lobes 136, 138, 140 and 142 to receive the lobes therein when rotor 112 is rotated in one direction and to allow the withdrawal or partial withdrawal of the lobes from the slots when rotor 112 is rotated in an opposite direction. Accordingly, slots 174, 176, 178 and 180 include lead surfaces 182, 184, 186 and 188, respectively, and angular trailing surfaces 190, 192, 194 and 196, respectively.

Friction disk 118 is disposed in housing 114 between bottom 122 and clutch 116. Friction disk 118 is of material to provide the desired friction resisting rotation of rotor 112 when axial force is applied there against by clutch 116. One surface 198 of friction disk 118 operates against a surface 200 of housing 114, and an opposite surface 202 operates against clutch surface 170. Alternatively, friction disk 118 can be omitted, and clutch surface 170 can operate directly against housing surface 200 to provide damping performance. As described previously for damper 10, surface coatings can be provided, materials selected and lubricants applied to achieve a desired damping performance.

FIG. 5 illustrates operation of damper 110 in a direction indicated by arrow 204 for free wheeling, with no damping performance. As torque or rotation is applied to rotor 112, via a moving device such as a lid or other article upon which damper 110 is installed, the angled lobes 136, 138, 140 and 142 on the rotor are urged inwardly more deeply into slots 174, 176, 178 and 180. Clutch 116 is thereby drawn axially away from friction disk 118, as indicated by arrow 206, and a gap 208 is established. Gap 208 can be established between clutch 116 and friction disk 118 as shown, but also can be established between friction disk 118 and housing surface 200 if friction disk 118 is carried with clutch 116, or is a coating on clutch 116. Yet alternatively, if friction disk 118 is not used, gap 208 is established between clutch 116 and housing surface 200. Generally, operation as just described establishes a position of clutch 116 which is more distant with respect to housing surface 200 such that rotor 112 is virtually free wheeling with minimal resistance.

FIG. 6 illustrates operation of rotor 112 in an opposite direction, indicated by arrow 210. As rotational force is applied to rotor 112, the angled lobes 136, 138, 140 and 142 are withdrawn from slots 174, 176, 178 and 180. Accordingly, outer surfaces 160, 162, 164 and 166 of lobes 136, 138, 140 and 142 are driven against trailing surfaces 190, 192, 194 and 196. Clutch 116 is urged axially toward and against friction disk 118, as indicated by arrow 212. Operation as just described establishes another position of clutch 116 which is nearer to housing surface 200 such that relative rotation between clutch 116, friction disk 118 and/or bottom 122 generates resistance to rotation of rotor 112. The resistance can be transmitted to the object controlled via connection at rotor shaft 130.

It should be understood that various aspects of damper 10 can be used in damper 110, and aspects of damper 110 can be used in damper 10. For example, damper 10 can be provided with a sleeve or cylinder of friction material similar to friction plate 118 between housing surface 68 and leaf outer surfaces 62, 64 and 66. Clutch 16 can then be moved against an away from the sleeve or cylinder rather than directly against surface 68.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A rotary damper comprising:
   a housing having a bottom;
   a rotor having a rotor plate rotatable in said housing in a substantially fixed position axially in said housing, said rotor having a rotational speed; and
   an unbiased clutch plate engaged with said rotor for axial movement in said housing, said clutch plate being disposed at first and second distances from said bottom when said rotor is rotated in first and second directions, respectively, said clutch plate further configured to rotate with said rotor in the same direction as said rotor such that said clutch plate rotates at the same rotational speed as said rotor.

2. The rotary damper of claim 1, including a friction plate between said clutch plate and said bottom.

3. The rotary damper of claim 1, said rotor plate having an end surface and a plurality of wedges on said end surface.

4. The rotary damper of claim 3, said clutch plate having a surface confronting said rotor plate end surface, and said clutch plate surface having angular slots receiving said wedges.

5. The rotary damper of claim 4, said rotor plate having four said wedges and said clutch plate having four said slots.

* * * * *